United States Patent [19]

Itoh et al.

[11] Patent Number: 4,622,865

[45] Date of Patent: Nov. 18, 1986

[54] APPARATUS FOR CONTROLLING CONTINUOUSLY VARIABLE TRANSMISSION WHEN ACCELERATING FROM LOW SPEEDS

[75] Inventors: Hiroshi Itoh; Mitsuru Takada, both of Toyota, Japan

[73] Assignee: Toyota Jidosha Kabushiki Kaisha, Toyota, Japan

[21] Appl. No.: 676,197

[22] PCT Filed: Jul. 11, 1984

[86] PCT No.: PCT/JP84/00357

§ 371 Date: Nov. 15, 1984

§ 102(e) Date: Nov. 15, 1984

[30] Foreign Application Priority Data

Jul. 13, 1983 [JP] Japan ................ 58-126110

[51] Int. Cl.⁴ .................. B60K 41/18; B60K 41/12
[52] U.S. Cl. ..................... 74/866; 364/424.1
[58] Field of Search ............ 74/866, 877, 874, 872, 74/870, 862, 865; 364/424.1

[56] References Cited

U.S. PATENT DOCUMENTS

| | | | |
|---|---|---|---|
| 3,684,066 | 8/1972 | Kubo et al. | 74/866 X |
| 3,942,393 | 3/1976 | Förster et al. | 74/866 |
| 4,200,007 | 4/1980 | Espenschied et al. | 74/872 X |
| 4,291,594 | 9/1981 | Baudoin | 74/866 X |
| 4,338,666 | 7/1982 | Suzuki et al. | 364/424.1 |
| 4,471,437 | 9/1984 | Yoshino et al. | 74/866 X |
| 4,515,040 | 5/1985 | Takeuchi et al. | 74/864 X |
| 4,543,855 | 10/1985 | Oetting et al. | 74/865 X |

FOREIGN PATENT DOCUMENTS

| | | | |
|---|---|---|---|
| 180864 | 10/1983 | Japan . | |
| 0603603 | 4/1978 | U.S.S.R. | 74/866 |
| 0867710 | 9/1981 | U.S.S.R. | 74/865 |

Primary Examiner—Kenneth J. Dorner
Assistant Examiner—Dirk Wright
Attorney, Agent, or Firm—Oblon, Fisher, Spivak, McClelland & Maier

[57] ABSTRACT

An apparatus for controlling an continuously variable transmission (CVT) used for a power transmission system of a vehicle. The CVT is controlled such that an actual engine speed becomes a desired engine speed. The desired engine speed is set as a function of running parameter such as intake throttle position. When the CVT is controlled in the same way as at the steady state of the vehicle at the acceleration of the vehicle, the acceleration performance is degraded. Thus, according to the present invention, the speed ratio of the CVT is reduced when the acceleration of the vehicle is small, in spite of the requisition of the vehicle acceleration. As a result, satisfactory drivability is attained.

6 Claims, 6 Drawing Figures

ગુજરાતી4,622,865

APPARATUS FOR CONTROLLING CONTINUOUSLY VARIABLE TRANSMISSION WHEN ACCELERATING FROM LOW SPEEDS

DESCRIPTION

Field of the Art

This invention relates to an apparatus for controlling a continuously variable transmission (hereinafter called "CVT") used for a power transmission system of a vehicle and particularly to an apparatus for controlling same in acceleration.

BACKGROUND OF THE ART

A CVT is to control continously speed ratio e (=output side rotational speed Nout/input side rotational speed Nin) to be used for a vehicle as a power transmission system having excellent specific fuel consumption. In the CVT, a desired engine speed No is set as a function of running parameter of an engine such as intake throttle position $\theta$, vehicle speed V or the like and the CVT is controlled such that an actual engine speed Ne becomes the desired engine speed No. However, to provide drive feeling and drivability corresponding to the excellent specific fuel consumption and vehicle speed, the desired engine speed was set to a low value in low vehicle speed according to Pat. No. Sho-58-17551 applied previously by this applicant. Thus, even if a driver tries to accelerate a vehicle from a low vehicle speed in climbing a extremely steep slope by pedalling an accelerator pedal, the engine speed Ne is just slightly increased and engine output is not so much increased that unsatisfactory acceleration is disadvantageously provided.

DISCLOSURE OF THE INVENTION

An object of the present invention is to provide an apparatus for controlling a CVT which ensures necessary engine output to provide satisfactory acceleration even in the acceleration from low vehicle speed.

According to the present invention to achieve this object, in the apparatus which sets a desired engine speed No as a function of running parameter and controls the CVT for a vehicle such that an actual engine speed Ne becomes the desired engine speed No, a speed ratio e of the CVT is reduced when the acceleration of the vehicle is required or demanded and the increase of a vehicle speed V is small.

Thus, in the acceleration from low vehicle speed in climbing a steep slope or the like, the speed ratio e is reduced if the acceleration of the vehicle is insufficient, and drive torque is increased as the engine output is increased so that the vehicle is to be rapidly accelerated.

Preferably, the desired engine speed No is increased to reduce the speed ratio e.

Further preferably, the desired engine speed No is increased by a predetermined amount, for example, in a predetermined interval of time until the vehicle speed V is highly increased, i.e. until the sufficient acceleration of the vehicle is obtained. Whether or not the acceleration is required is to be detected by comparing intake throttle position $\theta$ or its change with the passage of time with predetermined values $\theta_1$, $\Delta\theta_1$.

For running parameters to set the desired engine speed No is to be selected the throttle position $\theta$ or intake pipe negative pressure P, vehicle speed V or the like.

THE MOST PREFERABLE EMBODIMENT FOR EMBODYING THE PRESENT INVENTION

Hereinafter will be detailed the present invention will reference to the drawings.

Figure 1:
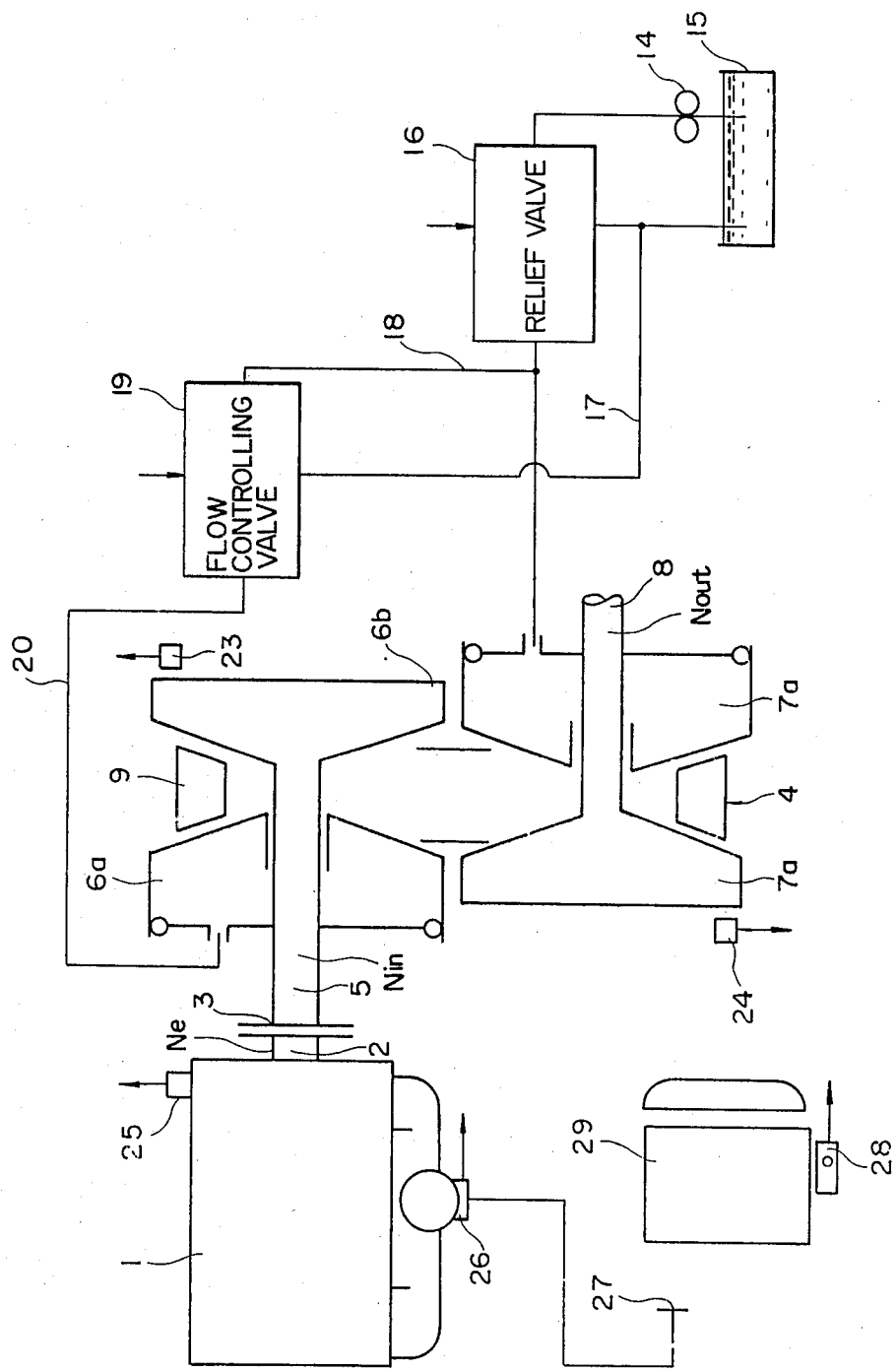
FIG. 1 is a schematic view showing a whole CVT to which the present invention is applied.

In FIG. 1, a crankshaft 2 of an engine 1 is connected to an input shaft 5 of a CVT 4 through a clutch 3. A pair of input side disks 6a,6b are provided opposed to each other, one input side disk 6a being provided on the input shaft 5 relatively axially slidably and the other input side disk 6b being fixedly secured to the input shaft 5. Also, a pair of output side disks 7a,7b are provided opposed to each other, one output side disk 7a being secured fixedly to an output shaft 8 and the other output side disk 7b being provided on the output shaft 8 axially movably. A belt 9 having an equilateral trapezoidal cross-section is trained over the input side disks 6a,6b and the output side disks 7a,7b. The opposed surfaces of the input side disks 6a,6b and the output side disks 7a,7b are tapered to increase the distance between themselves as they extend radially outward. The engaging radii of the belt 9 on the input and output side disks 6a,6b and 7a,7b are increased or decreased in relation to the increase or decrease of the distance between the opposed surfaces to change a speed ratio and a transmission torque. An oil pump 14 sends oil sucked from an oil reservoir 15 to a relief valve 16. The linear solenoid system relief valve 16 controls an oil amount drained to a drain 17 to control line pressure in an oil path 18. The oil path 18 is connected to a hydraulic cylinder of the output side disk 7b. When a linear solenoid system flow controlling valve 19 increases a press force between the input side disks 6a,6b to increase the speed ratio e(=rotational speed Nout of output side disks 7a,7b rotational speed Nin of input side disks 6a,6b provided Nin=engine speed Ne), the sectional area of flow between an oil path 20 to a hydraulic cylinder of the input side disk 6a and the oil path 18 is increased while the oil path 20 is disconnected from the drain 17. Also, when the press force between the input side disks 6a,6b is decreased to reduce the speed ratio e, the oil path 18 is disconnected from the oil path 20 while the sectional area of flow between the oil path 20 and the drain 17 is controlled. Rotational angle sensors 23,24 detect respectively the rotational speeds Nin,Nout of the input and output side disks 6b,7a. Cylinder oil pressure of the output side disk 7b, i.e. line pressure, is controlled to be the minimum oil pressure to ensure torque transmission without any slip of the belt 9 so that the drive loss of the pump 14 is restrained. The speed ratio of the CVT 4 is controlled by oil flow to the input side disk 6a. Further, while the cylinder oil pressure of the output side disk $7b \geq$ cylinder oil pressure of the input side disk 6a, the input side pressure receiving area of the cylinder piston > the outside one of same and the speed ratio less than 1 may be realized. A water temperature sensor 25 detects cooling water temperature of the engine 1. A throttle position sensor 26 detects the position of an intake throttle valve interlocked with an accelerator pedal 27. A shift position sensor 28 detects the range of a shift lever near a seat 29.

Figure 2:
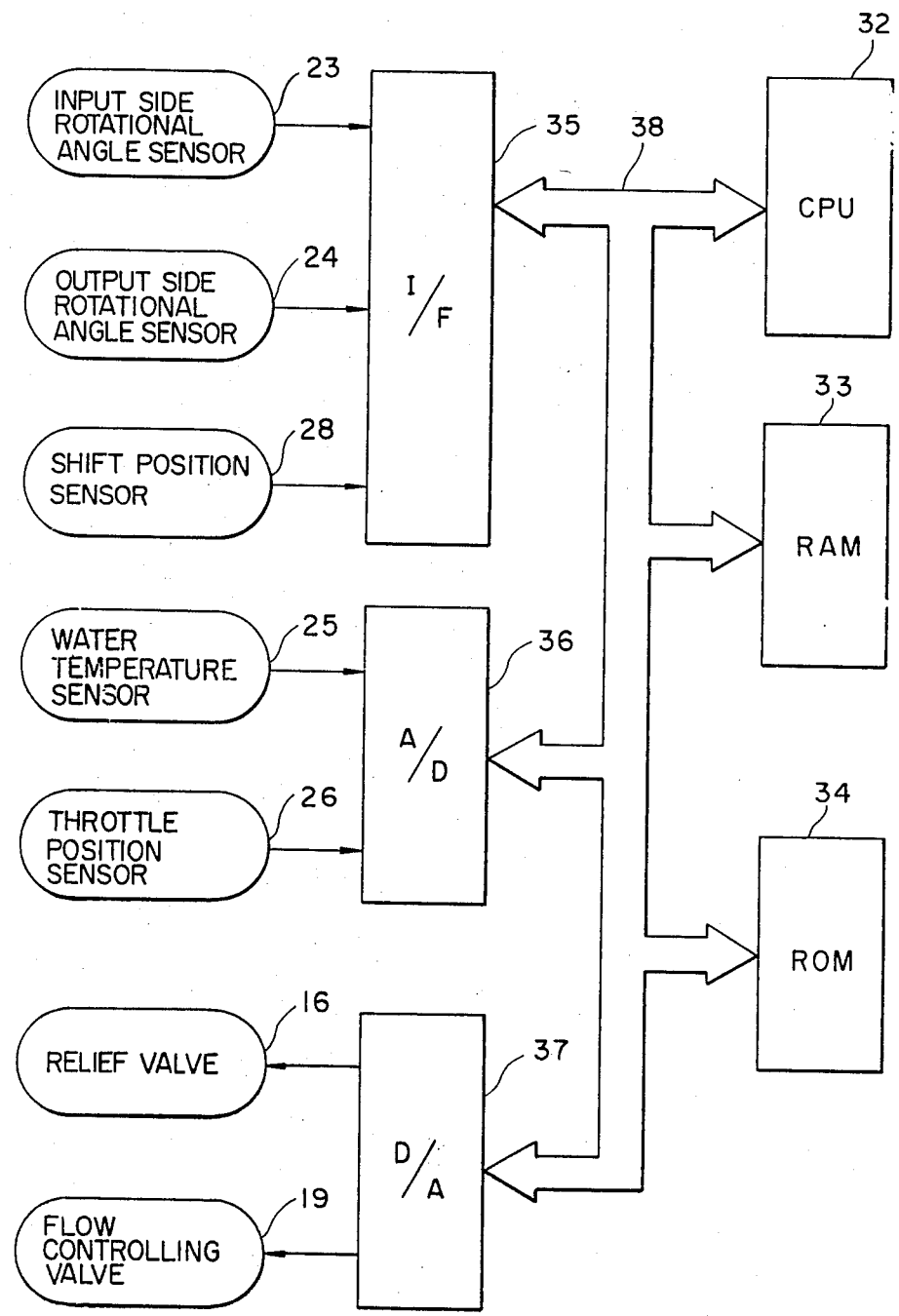
FIG. 2 is a block diagram showing an electronic control apparatus.

FIG. 2 is a block diagram showing an electronic control apparatus. CPU 32, RAM 33, ROM 34, I/F(interface) 35, A/D(analog/digital converter) 36 and D/A(digital/analog converter) 37 are connected to each other by a bus 38. The output pulses of the rotational angle sensors 23,24 and the shift position sensor 28 are sent to the interface 35, the analog outputs of the water temperature sensor 25 and the throttle position sensor 26 sent to A/D 36 and the output of D/A 37 sent to the relief valve 16 and the flow controlling valve 19.

Figure 3:
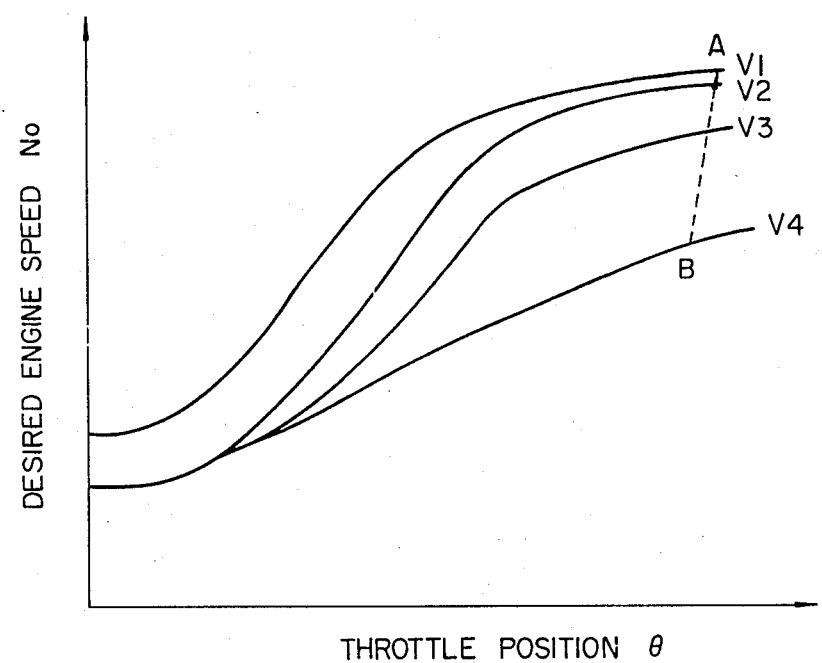
FIG. 3 is a graph showing a desired engine speed.

FIG. 3 shows the desired engine speed No. The solid line shows the original desired engine speed No which is set as a function of the throttle positon $\theta$ and the vehicle speed V, provided V1>V2>V3>V4 and V1, V2, V3 and V4 are selected at intervals of 20 Km/h for example and the desired engine speed No corresponding to the throttle position $\theta$ and the vehicle speed V is calculated from limited data stored in ROM 34 by interpolation. In the control apparatus of the CVT 4, the engine speed Ne or the speed ratio e is controlled such that the actual engine speed Ne becomes the desired engine speed No. Referring to the solid line in FIG. 3, since the relationship between $\theta$, V and No is determined such that the larger the vehicle speed V is in the same throttle position $\theta$, the larger the desired engine speed No is, when the throttle position $\theta$ is slithtly increased in low vehicle speed, unfavorable degradation of drive feeling caused by the excessive increase of the engine speed Ne is to be avoided while a large engine output satisfying the need of a driver is to be ensured in kick-down during high speed travelling. However, when the desired engine speed No under all running conditions of the engine is defined only by the solid line in FIG. 3, the engine output necessary for accelerating the vehicle while climbing a steep slope is not produced due to the low desired engine speed No, even if the throttle position $\theta$ is maximized in the acceleration from the low vehicle speed like the acceleration in climbing the steep slope, so that the insufficient acceleration is provided inconveniently. Thus, according to the present invention, when the sufficient acceleration is not attained, for example when the increment $\Delta V$ of the vehicle speed V per a certain time $\Delta t$ is less than a predetermined value $\Delta V1$, the desired engine speed No is raised from the original position B to position A to increase the engine output as shown by the broken line. As a result of the increase of the desired engine speed No, the speed ratio e of the CVT 4 is reduced to increase the drive torque so that the vehicle is rapidly accelerated.

Figure 4:
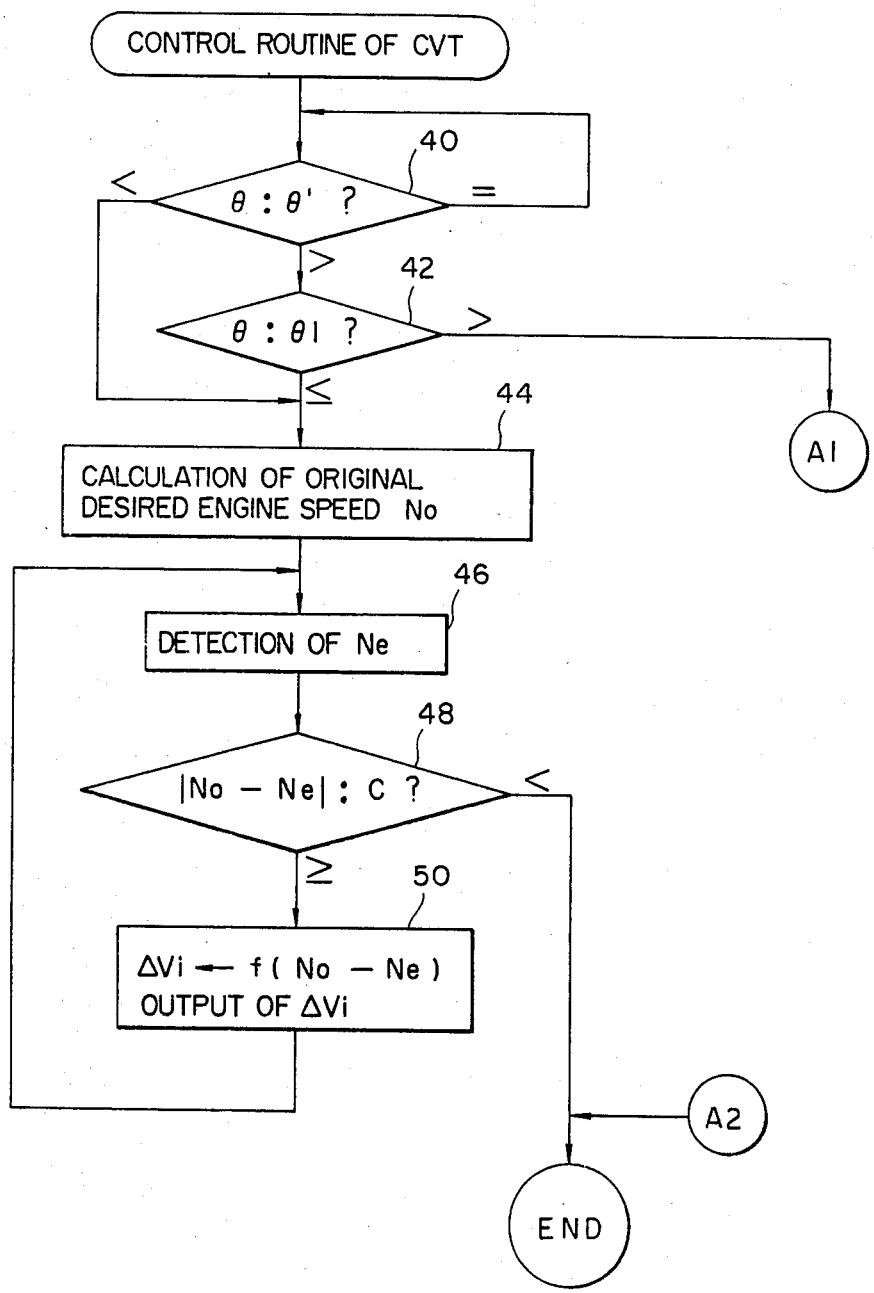
FIGS. 4 and 5 are flow charts showing control routine of the CVT.
Figure 5:
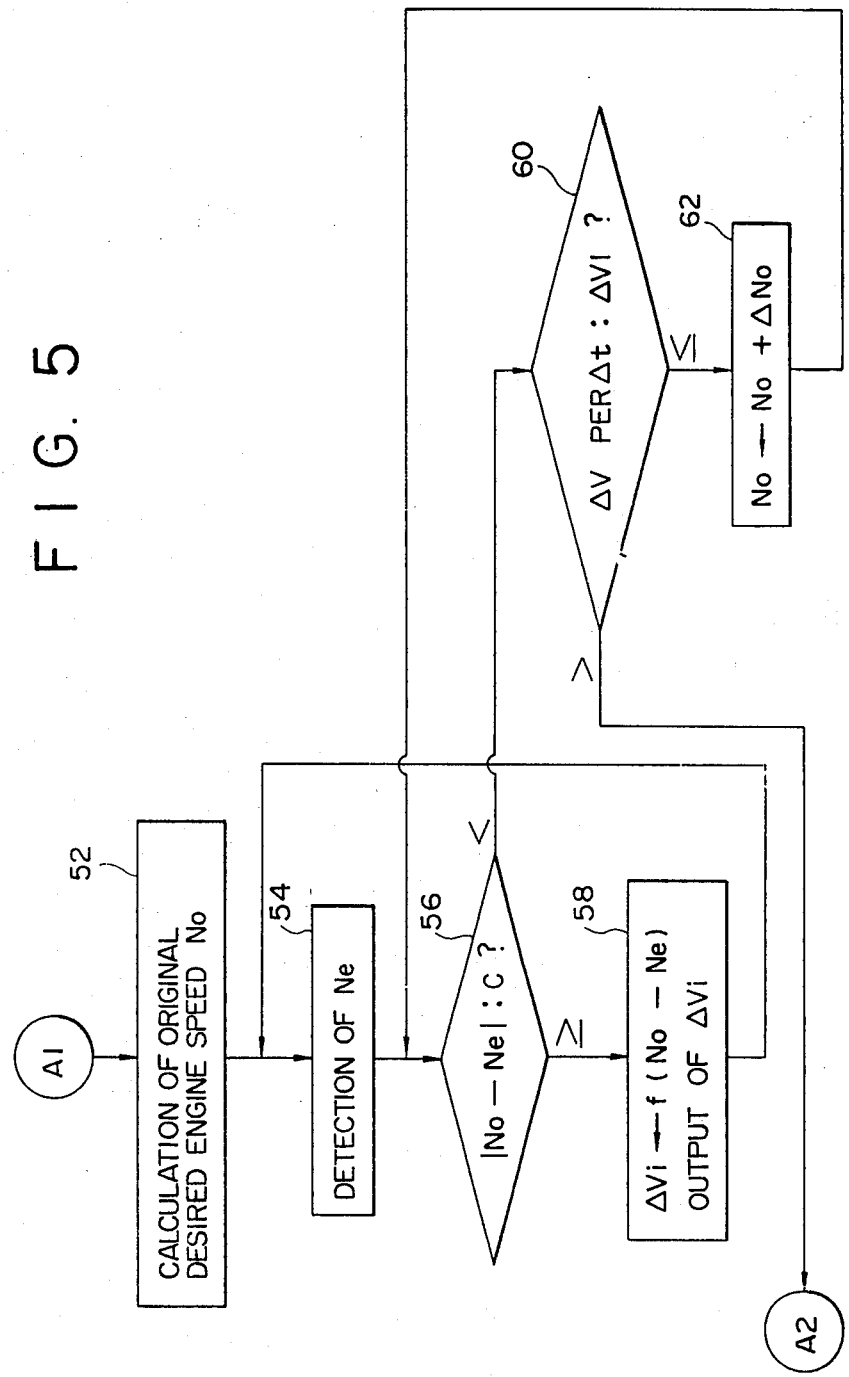

FIGS. 4 and 5 are flow charts showing a control routine of the CVT 4. When gentle acceleration is required and sufficient acceleration to correspond to even requisition of abrupt acceleration is attained, the desired engine speed No is set to the original value as defined by the solid line in FIG. 3. However, when the actual engine speed Ne approaches sufficiently the desired engine speed No and still the vehicle is not sufficiently accelerated in spite of requisition of abrupt acceleration, the desired engine speed No is increased by the predetermined amount $\Delta No$ in a predetermined cycle until sufficient acceleration is attained, i.e. the desired engine speed No is modified as shown by the broken line in FIG. 3. While whether required acceleration is abrupt one or gentle one is determined in step 42 by comparing the throttle position $\theta$ with a predetermined value $\theta 1$, the variation $\Delta\theta$ of the throttle position $\theta$ per a certain time $\Delta t$ may be compared with a predetermined value $\Delta\theta 1$. When abrupt acceleration is required, $\Delta\theta$ is larger than $\Delta\theta 1$. Also, whether or not the acceleration of the vehicle is sufficient is detected by comparing the increment $\Delta V$ of the vehicle speed V per the certain time $\Delta t$ with the predetermined value $\Delta V1$. Detailing each step, in step 40 is compared the throttle position $\theta$ detected this time with the throttle position $\theta'$ previously detected, and advance is made to step 42 when $\theta>\theta'$ and the vehicle is judged to be accelerated. When $\theta=\theta'$, the step 40 is again carried out, and when $\theta<\theta'$, i.e. in the deceleration, advance is made to step 44. In step 42 is compared the throttle position $\theta$ with the predetermined value $\theta 1$. When $\theta \leq \theta 1$, i.e. gentle acceleration is required, advance is made to step 44 and when $\theta>\theta 1$, i.e. abrupt acceleration is required, advance is made to step 52. In step 44 is calculated the original desired engine speed No, i.e. the desired engine speed No shown by the solid line in FIG. 3. In step 46 is detected the actual engine speed Ne. In step 48 is compared $|No-Ne|$ with a predetermined value C and when $|No-Ne| \leq C$, i.e. the actual engine speed Ne approaches sufficiently the desired engine speed No, the routine is completed. When $|No-Ne| \geq C$, i.e. the actual engine speed Ne is separated largely from the desired engine speed, advance is made to step 50. In step 50 is calculated the variation $\Delta Vi$ of control voltage Vi of the flow controlling valve 19 as a function f (No-Ne) of No-Ne, while the output $\Delta Vi$ is generated and retreat is made to step 46. Steps 52 to 58 correspond to steps 44 to 50 respectively, provided advance is made to step 60 when $|No-Ne|<C$ in step 56. In step 60 is compared the variation $\Delta V$ of the vehicle speed V per a certain time $\Delta t$ with the predetermined value $\Delta V1$ and the routine is completed when $\Delta V>\Delta V1$, i.e. acceleration is sufficient. When $\Delta V \leq \Delta V1$, i.e. acceleration is insufficient, advance is made to step 62. In step 62 is increased the desired engine speed No by a predetermined positive amount $\Delta No$ and retreat is made to step 56.

Figure 6:
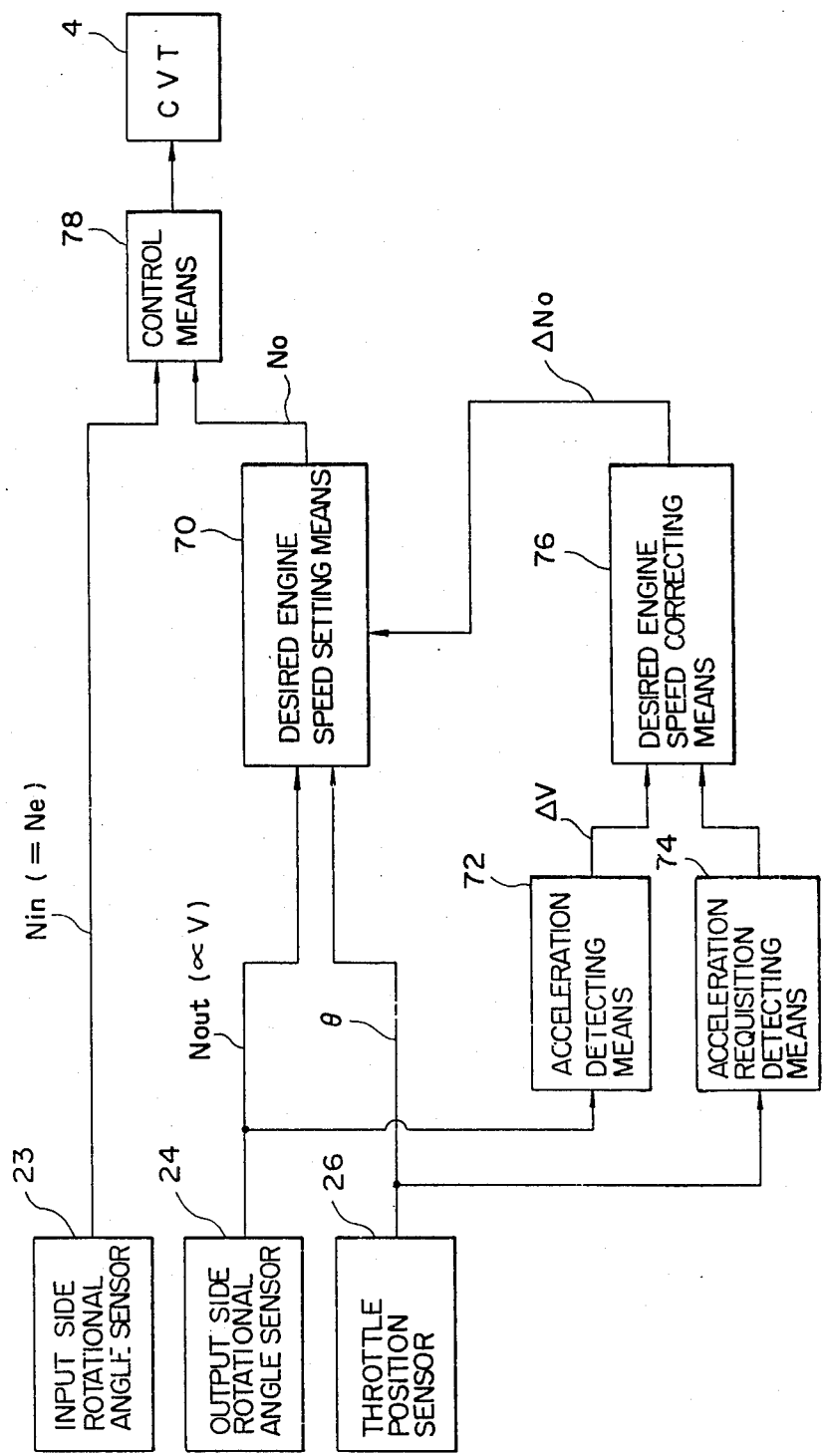
FIG. 6 is a functional block diagram according to the present invention.

FIG. 6 is a functional block diagram according to the present invention.

The input side rotational speed Nin of the CVT 4 detected by the input side rotational angle sensor 23 is equal to the engine speed Ne, and the output side rotational speed Nout of the CVT 4 detected by the output side rotational angle sensor 24 is proportional to the vehicle speed V. A desired engine speed setting means 70 sets the desired engine speed No from the vehicle speed V and the throttle position $\theta$ in a steady period according to the characteristics shown by the solid line in FIG. 3. An acceleration detecting means 72 detects the variation $\Delta V$ of the vehicle speed V per time $\Delta t$, i.e. the acceleration of the vehicle. An accelration requisition detecting means 74 detects that the throttle position $\theta$ is larger than a predetermined value $\theta 1$, i.e. the requisition of vehicle acceleration. A desired engine speed correcting means 76 functions as a means for reducing the speed ratio of the CVT 4, i.e. a speed ratio reducing means to send correcting directions to the desired engine speed setting means 70 when $\Delta V \leq \Delta V1$, i.e. the acceleration is small, in spite of the requisition of the vehicle acceleration and increase the desired engine speed No by $\Delta No$ in a predetermined cycle. A control means 78 controls the speed ratio e of the CVT 4 such that the actual engine speed Ne becomes the desired engine speed. As a result, when sufficient acceleration of the vehicle is not attained in spite of the requisition of the vehicle acceleration, the drive torque is increased by the increase the desired engine speed, i.e. the speed ratio e to provide satisfactory drivability.

We claim:

1. An apparatus for controlling a continuously variable transmission including a desired engine speed setting means (70) for setting the desired engine speed as a function of running parameter and a control means (78) for controlling a continuously variable transmission (4) such that an actual engine speed becomes a desired engine speed, comprising:
   an acceleration requisition detecting means (74) for detecting the requisition of vehicle acceleration;
   an acceleration detecting means (72) for detecting the vehicle acceleration; and
   a speed ratio reducing means (76) for reducing the speed ratio of the continuously variable transmission when the vehicle acceleration is small while the vehicle acceleration is demanded.

2. An apparatus for controlling a continuously variable transmission as defined in claim 1, wherein said speed ratio reducing means (76) includes a desired engine speed correcting means for reducing the speed ratio by increasing the desired engine speed.

3. An apparatus for controlling a continuously variable transmission as defined in claim 2, wherein said desired engine speed correcting means increases the desired engine speed by a predetermined increment until acceleration of the vehicle is enlarged.

4. An apparatus for controlling a continuously variable transmission as defined in claim 1, wherein said acceleration detecting means (72) detects the requisition of vehicle acceleration from comparison of intake throttle position with a predetermined value.

5. An apparatus for controlling a continuously variable transmission as defined in claim 1, wherein said desired engine speed setting means (70) selects the intake throttle position or intake pipe negative pressure and the vehicle speed as running parameters.

6. An apparatus for controlling a continuously variable transmission as defined in claim 1, wherein said acceleration detecting means (72) detects the requisition of vehicle acceleration from comparison of the change of intake throttle position with the passage of time with a predetermined value.

* * * * *